J. Smith, Jr.,
Lock Hinge,
Nº 36,865. Patented Nov. 4, 1862.
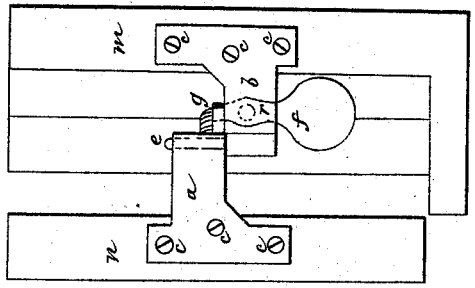
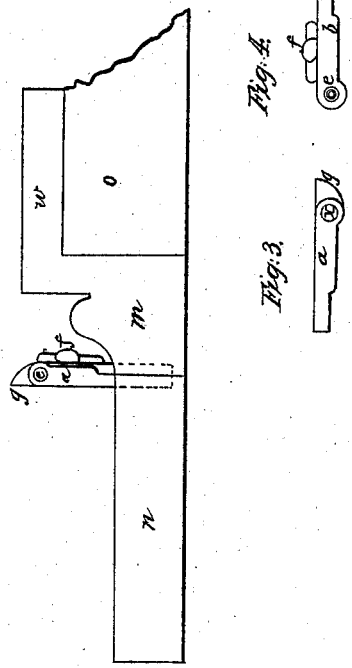
Witnesses:
James L. Johnston
C. A. Chamberlin
Inventor:
Joel Smith jr

UNITED STATES PATENT OFFICE.

JOEL SMITH, JR., OF ALLEGHENY CITY, PENNSYLVANIA.

IMPROVEMENT IN HINGES FOR SHUTTERS.

Specification forming part of Letters Patent No. 36,865, dated November 4, 1862.

*To all whom it may concern:*

Be it known that I, JOEL SMITH, Jr., of the city and county of Allegheny, and State of Pennsylvania, have invented a new and Improved Mode of Making Self-Latching Hinges for Shutters, &c.; and I do hereby declare that the following is a full and exact description thereof, reference being had to the accompanying drawings, and to the letters of reference marked thereon.

The nature of my invention consists in an arrangement of a cam and eccentric lever, in combination with a hinge, for the purpose of holding the shutters of windows in a fixed position when open.

To enable others skilled in the art to make and use my invention, I will proceed to describe its construction and operation.

In the accompanying drawings, Figure 1 is a top view of a section of a window frame, casing, and shutter, representing also the position of the hinge when the shutter is closed. Fig. 2 is a front view representing the position of the hinge when the shutter is open. Fig. 3 is a top or edge view of the female part of the hinge. Fig. 4 is a top or edge view of the male part of the hinge.

$a$ is the female part of the hinge, which is furnished with opening $x$ (for the pin $e$ to play in) and cam $g$, (which is placed on the knuckle,) and is used for operating the eccentric-lever $f$, which is attached to the male part of the hinge $b$ by means of pin $t$, upon which it oscillates.

$e$ is the pin of the male part of the hinge.

$c$ are wood-screws used for securing the hinge to the shutter and window-frame.

$n$ is the window-shutter.

$m$ is the window-frame.

$w$ is the casing of the window-frame.

$o$ represents a section of a wall.

The operation of my improvement is as follows: The hinge is secured to the shutter and frame as represented in Fig. 2. When the shutter is closed, the hinge, with the lever $f$, will be in the position represented in Fig. 1. In opening the shutter, the cam $g$, on the knuckle of the female part of the hinge, will move the upper end of the lever $f$ sidewise until it (the lever) passes the cam. It will then fall back into a perpendicular position, as represented in Fig. 2. The lever $f$ is kept in a perpendicular position by the weight of its lower end. When the shutter is open, the hinge, with the lever $f$, will be in the position represented in Fig. 2. In closing the shutter, the lever $f$ is moved by the hand sidewise, so as to allow the cam to pass the upper end of the lever, and then, the shutter being released, is closed in the ordinary manner. The upper hinge on the shutter is of ordinary construction, but made to correspond in size to the lower hinge.

The advantages of my improvement are, first, great simplicity and cheapness; second, durability, as the self-latching part will not get out of order and become inoperative by use; third, security, as the shutter can never be closed by wind or other accidental causes; fourth, great ease in operating it, as the shutter does not have to be raised in order to open or shut it, and the latch being close to the window-frame is always accessible, thus obviating the necessity of raising the window much and leaning out to close the shutter.

Having thus described the nature, construction, operation, and advantages of my improvement, what I claim as my invention, and desire to secure by Letters Patent of the United States, is—

The arrangement of the cam $g$ and eccentric-lever $f$, when used in combination with the hinge, arranged, constructed, and operated substantially as herein described, and for the purpose set forth.

JOEL SMITH, JR.

Witnesses:
  C. A. CHAMBERLIN,
  GEO. MATTHEWS.